United States Patent
Kim

(12) United States Patent (10) Patent No.: US 6,484,901 B1
Kim (45) Date of Patent: Nov. 26, 2002

(54) AUTOMATIC VENDING MACHINE FOR STICKER AND CARICATURE PRINTED ARTICLE

(76) Inventor: Jae-Sung Kim, 2nd Floor, 90-9 Okum-Dong, Songpa-Ku, Seoul, 138-130 (KR)

( * ) Notice: Subject to any disclaimer, the term of this patent is extended or adjusted under 35 U.S.C. 154(b) by 0 days.

(21) Appl. No.: 09/674,602
(22) PCT Filed: May 9, 2000
(86) PCT No.: PCT/KR00/00435
§ 371 (c)(1),
(2), (4) Date: Nov. 30, 2000
(87) PCT Pub. No.: WO00/72278
PCT Pub. Date: Nov. 30, 2000

(30) Foreign Application Priority Data

May 20, 1999 (KR) .............................. 99-18279

(51) Int. Cl.[7] ................................ G07F 11/00
(52) U.S. Cl. ........................... 221/7; 707/502
(58) Field of Search .................. 221/24, 2, 3, 7, 221/9, 15; 345/441; 707/502

(56) References Cited

U.S. PATENT DOCUMENTS

| 5,175,625 A | 12/1992 | Miles |
| 6,021,417 A | 2/2000 | Massarksy |

FOREIGN PATENT DOCUMENTS

| EP | 0497598 | 8/1992 |
| JP | 01-219965 | 9/1989 |
| JP | 04-176283 | 6/1992 |
| JP | 4176283 A2 * | 6/1992 |
| JP | 06/189308 | 7/1994 |
| JP | 6189308 A2 * | 7/1994 |

* cited by examiner

Primary Examiner—Kenneth W. Noland
(74) Attorney, Agent, or Firm—Dickinson Wright PLLC

(57) ABSTRACT

An automatic vending machine for a sticker combinable caricature printed article is provided. The automatic vending machine includes a memory, a caricature outputting printer, a sticker outputting printer and a controller for controlling the operation of the respective elements. The automatic vending machine provides not only a sticker on which a face of a user is photographed but also a caricature printed article printed on A4 size paper, thereby satisfying user's various choices. According to user's option, a caricature printed sticker can also be obtained.

4 Claims, 7 Drawing Sheets

AUTOMATIC VENDING MACHINE FOR STICKER AND CARICATURE PRINTED ARTICLE

FIELD OF INVENTION

The present invention relates to an automatic vending machine for photograph printed stickers, and more particularly, to an automatic vending machine for a sticker combinable caricature printed article, for receiving image data of a user by means of a camera or the like, editing the same according to user's option and outputting the edited image data on a sheet of sticker paper.

BACKGROUND OF INVENTION

In general, a conventional automatic vending machine for stickers receives image data of a user by means of an image pickup unit such as a camera and edits the image data with a previously stored background image to then be output on sticker paper. The conventional automatic vending machine outputs only a multitude of small-sized stickers on which photographs are printed. Thus, the conventional sticker vending machine cannot satisfy users' various choices.

DISCLOSURE OF THE INVENTION

It is an object of the present invention to provide an automatic vending machine for a sticker combinable caricature printed article, for outputting not only a stamp-sized sticker but also a caricature of a user on A4 size paper, for sales.

To accomplish the above object of the present invention, there is provided an automatic vending machine for a sticker combinable caricature printed article having a housing having a predetermined shape and providing a space required for installing necessary components, a money identifier installed in the housing and allowing a normal user who complies with a prescribed procedure to use the automatic vending machine, a camera connected to the housing, for receiving necessary image data, a monitor for displaying a predetermined selected image for viewing by the user, and inputting means allowing the user to edit the image data and to optionally execute desired operations, the automatic vending machine including memory means in which in which data of an operating system program and an exclusive program for caricature processing is stored, a caricature outputting printer for outputting image data received by the camera and applied to the exclusive program for caricature processing as a caricature printed article, a sticker outputting printer for outputting the image data received by the camera on sticker paper, and control means for controlling the operation of the respective elements.

Preferably, the housing further includes a plurality of illuminators installed around the camera, for processing shades of the caricature.

More preferably, the automatic vending machine according to the present invention further includes an external monitor for allowing the image received by the camera and processed to be viewed by passers-by.

BEST MODE FOR CARRYING OUT THE INVENTION

A preferred embodiment of the present invention will now be described in detail with reference to the accompanying drawings.

Figure 1:
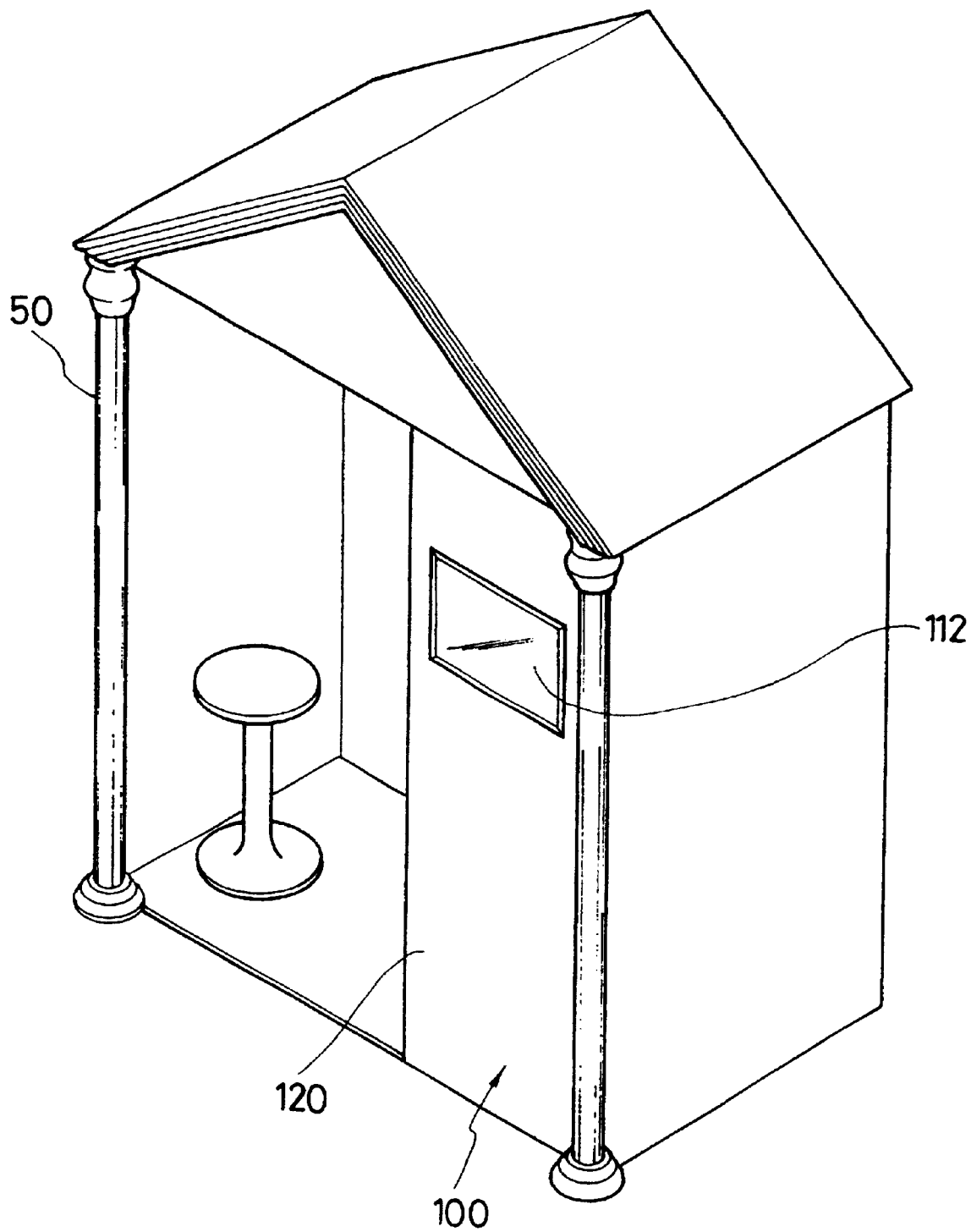
FIG. 1 is a perspective view of an automatic vending machine for a sticker combinable caricature printed article according to the present invention.
Figure 2:
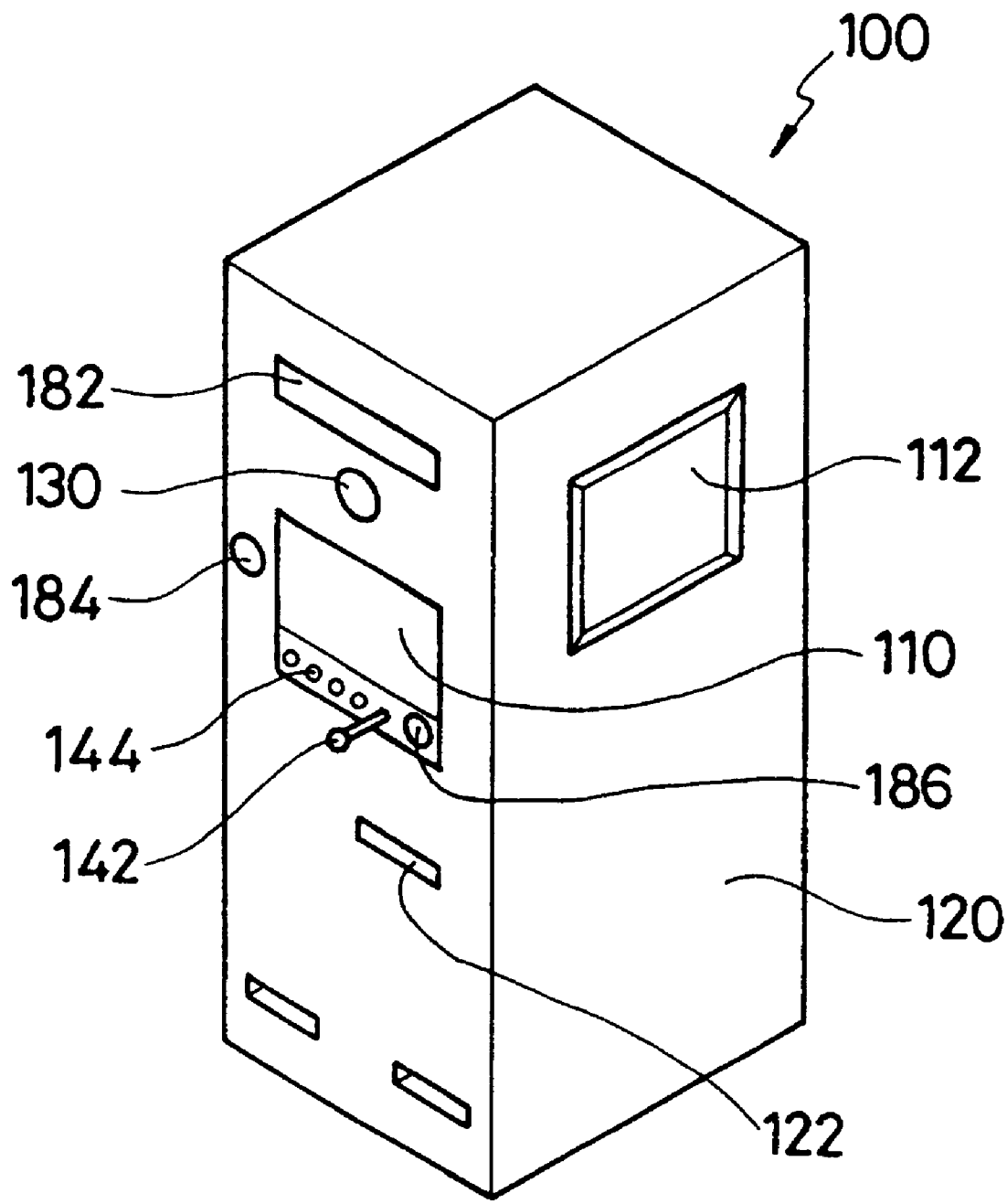
FIG. 2 is a perspective view illustrating the state in which the automatic vending machine shown in FIG. 1 is installed.
Figure 3:
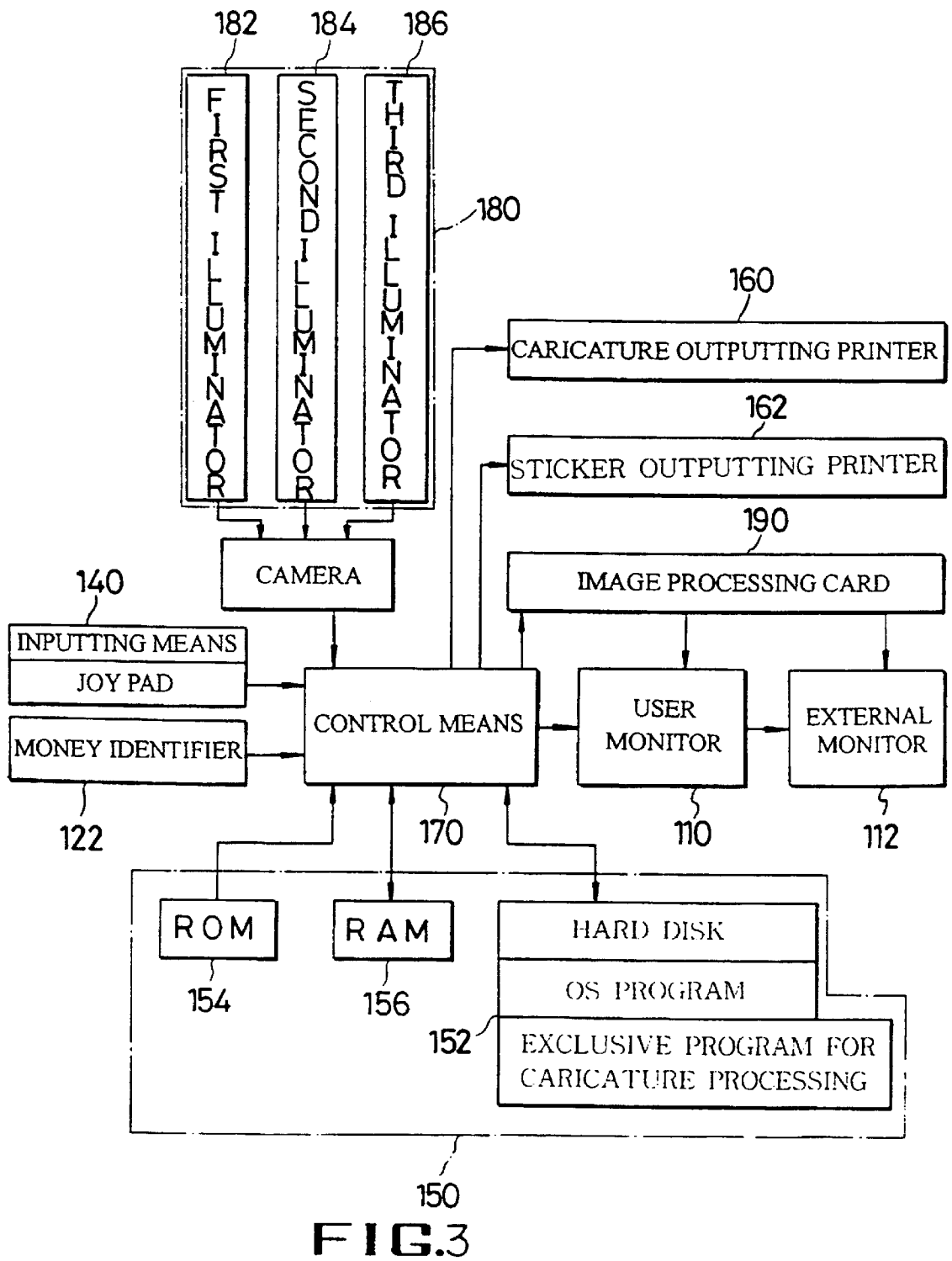
FIG. 3 is a block diagram of the automatic vending machine according to the present invention.

FIG. 1 is a perspective view of an automatic vending machine for a sticker combinable caricature printed article according to the present invention. FIG. 2 is a perspective view illustrating the state in which the automatic vending machine shown in FIG. 1 is installed, and FIG. 3 is a block diagram of the automatic vending machine according to the present invention.

Referring to FIG. 2, the automatic vending machine 100 according to the present invention is installed within a frame member 50 made of fiberglass-reinforced plastic (FRP), and an external monitor 112 is configured so as to be viewed by passers-by in the state where the automatic vending machine 100 is installed.

As shown in FIGS. 1 and 2, the automatic vending machine 100 for a sticker combinable caricature printed article according to the present invention includes a housing 120. The housing 120 provides a space required for installing necessary components.

A money identifier 122 is installed in the housing 120. The money identifier 122 allows only a person who paid a predetermined amount of money to use the automatic vending machine 100. Here, "money" is generally termed to cover coins, bills, credit cards and electronic money. The money identifier 122 allows a normal user who complies with a prescribed procedure to use the automatic vending machine 100.

The automatic vending machine 100 according to the present invention also includes a camera 130. The camera 130 is preferably installed inside the housing 120 such that only a lens is exposed outside. The camera 130 is a device for receiving necessary image data, that is, image data of a user, and a closed circuit television (CCTV) camera, a digital camera, a video camera or the like can be used as the camera 130.

The housing 120 includes two monitors 110 and 112. The monitor 110 installed around the center of the front face of the housing 120, is a monitor for viewing by the user. The monitor 112 installed around the upper portion of the lateral face of the housing 120, is a monitor for viewing by passers-by. The monitors 110 and 112 may be configured to simultaneously display an identical image using a monitor distribution device. A user-operated inputting means 140 is installed on the front face of the lower portion of the monitor 110. The inputting means 140 allows the user to edit input image data and to optionally execute desired operations, and examples thereof include a joy pad consisting of a joy stick 142 and buttons 144. The buttons 144 are at least four, and examples thereof include a button used for the money identifier 122, an OK button, a button for determination of money to be paid, and a button for being used in the event of system failure.

As shown in FIG. 3, the automatic vending machine 100 according to the present invention includes a memory means 150 having a hard disk 152 in which data such as an operating system program or an exclusive program for caricature processing, is stored, a read only memory (ROM) 154 in which data necessary for operating the other programs is stored, and a random access memory (RAM) 156 used as a main memory device.

A program necessary for processing images is proposed by the inventor of the present invention. According to the image processing program, images can be processed by selecting paint tools including charcoal, pen pr paintbrush, and painting methods for providing the feeling of water-color painting, oil painting, pastel painting. color-pencil painting, crayon-pastel painting and so on. In addition, the user may select a preferred artist's style of painting, for example, the style of Vincent van Gogh, Amedeo Modigliani, Edga Degas or Pierre-Auguste Renoir.

The automatic vending machine 100 according to the present invention includes a caricature outputting printer 160 and a sticker outputting printer 162. The caricature outputting printer 160 is for outputting the image data received by the camera 130 and applied to the exclusive program for caricature processing as a caricature printed article. The sticker outputting printer 162 is for outputting the image data received by the camera 130 on sticker paper. Here, a laser printer is suitably used as the caricature outputting printer 160 and an ink-jet color printer is suitably used as the sticker outputting printer 162.

The automatic vending machine 100 according to the present invention includes a control means 170 for controlling the operation of the respective elements which have been described above.

As shown in FIG. 1, in the housing 120, an illuminator unit 180 including a first illuminator 182 through a third illuminator 186 for processing shades of the caricature is further provided around the camera 130. The illuminator unit 180 is provided for processing shades of the caricature in a user's desired manner. Illuminated portions are brightly expressed and non-illuminated portions are darkly expressed, which can be appreciated by caricature outputs shown in FIGS. 5 through 7. Undefined reference numeral 190 denotes an image processing card.

Figure 4:
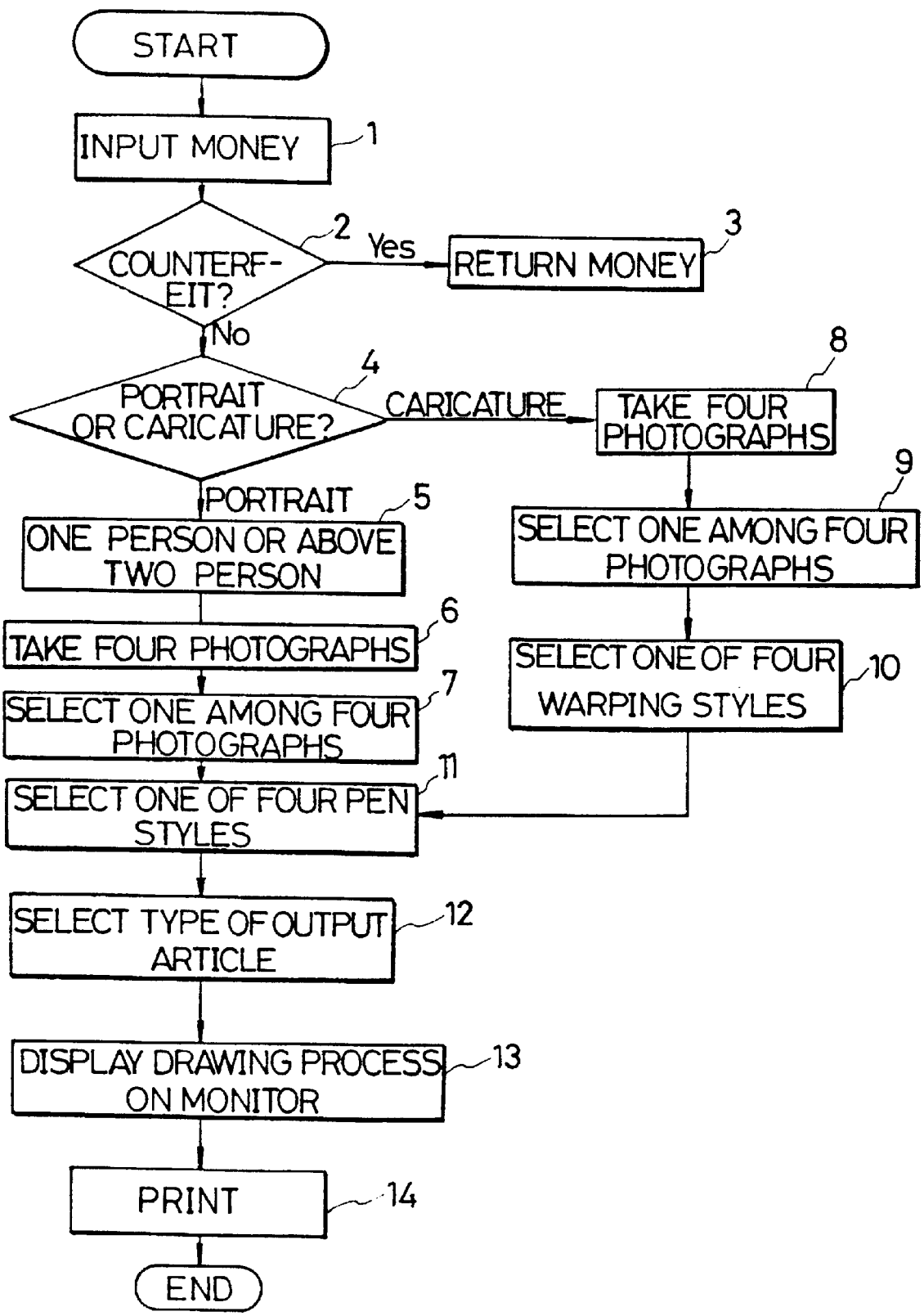
FIG. 4 is a flow diagram for explaining the operation of the automatic vending machine according to the present invention.
Figure 5:
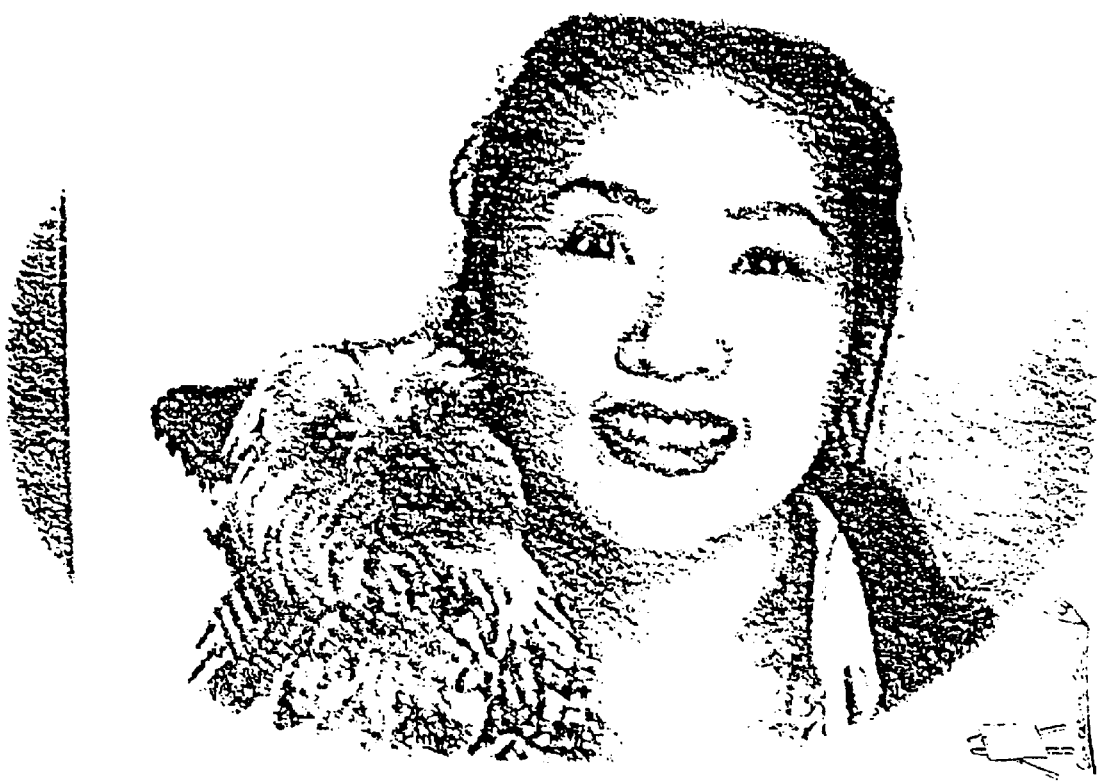
FIGS. 5 through 7 are graphic representations of caricature printed articles produced by the automatic vending machine according to the present invention.
Figure 6:
Figure 7:

FIG. 4 is a flow diagram for explaining the operation of the automatic vending machine for a sticker combinable caricature printed article according to the present invention, and FIGS. 5 through 7 illustrate caricature printed articles produced by the automatic vending machine according to the present invention. Specifically, FIG. 5 shows an ordinary caricature of a person, FIG. 6 shows that the central portion of the person's face is warped, and FIG. 7 shows an appropriately emphasized contour of the person's face.

In other words, if one who intends to use the automatic vending machine 100 according to the present invention inserts money into the money identifier 122 (step 1). it is checked whether the money is a counterfeit or not (step 2). If the money is a counterfeit, the money is returned (step 3). If not, either a caricature printed article or a portrait sticker is selected from the menu displayed on the monitor 110 by the user as desired (step 4).

In the case where the sticker is selected, the number of people to be photographed is then selected (step 5). Then, four photographs are taken (step 6) and a user's preferred one is selected (step 7).

In the case where the caricature printed article is selected, four photographs are taken (step 8) and a user's preferred one is selected (step 9). Then, a warping style is selected (step 10). Examples of the warping style include a face with a smile, a face with an anger, a tearful face, a face with only the nose elongated, and so on, and any of the user's desired style can be selected.

Then, a user's desired pen style is selected (step 11) and the type of an output article is selected (step 12). The pen style can be variably selected by using the program which has choices of pen, charcoal, contact, pencil or paintbrush. If necessary, a program which allows selection of another paint tools may be used. For example, the painting methods for generating color images for providing the feeling of water-color painting, oil painting, pastel painting, color-pencil painting, crayon-pastel painting or the like, can be selected.

The type of an output article includes a caricature printed on A4 size paper or a sticker. Also, the output article may be printed on decal or T-shirt. Otherwise, the portrait can be printed on A4 paper. Now, the process of drawing a caricature using the selected pen style is simultaneously displayed on the monitors 110 and 112 (step 13). The image data applied to the caricature drawing process or the photographed or captured image data is selectively printed on the caricature outputting printer or the sticker outputting printer in the form of a caricature printed on A4 paper or T-shirt or a sticker printed on sticker paper or T-shirt (step 14).

If necessary, image data can be obtained by adjusting the illumination of the respective illuminators according to the user's option.

As described above, according to the automatic vending machine for a sticker combinable caricature printed article of the present invention, not only a sticker on which a face of a user is photographed but also a caricature printed article printed on A4 size paper can be obtained, thereby satisfying user's various choices. According to user's option, a caricature printed sticker can also be obtained.

INDUSTRIAL APPLICABILITY

Although the invention has been described with reference to certain preferred embodiments, many other variations and uses are possible. For example, the automatic vending machine for a sticker combinable caricature printed article according to the present invention can be applied to the field of automatic or portable photography booths having an amusement value.

What is claimed:

1. An automatic vending machine for a sticker combinable caricature printed article having a housing having a predetermined shape and providing a space required for installing necessary components, a money identifier installed in the housing and allowing a normal user who complies with a prescribed procedure to use the automatic vending machine, a camera connected to the housing, for receiving necessary image data, a monitor for displaying a predetermined selected image for viewing by the user, and inputting means allowing the user to edit the image data and to optionally execute desired operations, the automatic vending machine comprising:

memory means in which in which data of an operating system program and an exclusive program for caricature processing, is stored:

a caricature outputting printer for outputting image data received by the camera and applied to the exclusive program for caricature processing as a caricature printed article;

a sticker outputting printer for outputting the image data received by the camera on sticker paper; and control means for controlling the operation of the respective elements.

2. The automatic vending machine according to claim 1, wherein the housing further comprises a plurality of illuminators installed around the camera, for processing shades of the caricature.

3. The automatic vending machine according to claim 1, further comprising an external monitor for allowing the image received by the camera and processed to be viewed by passers-by.

4. The automatic vending machine according to claim 2, further comprising an external monitor for allowing the image received by the camera and processed to be viewed by passers-by.

* * * * *